(12) United States Patent
Fuchs et al.

(10) Patent No.: US 7,261,834 B2
(45) Date of Patent: Aug. 28, 2007

(54) TUNABLE MAGNETO-RHEOLOGICAL ELASTOMERS AND PROCESSES FOR THEIR MANUFACTURE

(75) Inventors: Alan Fuchs, Reno, NV (US); Faramarz Gordaninejad, Reno, NV (US); Gregory H. Hitchcock, Reno, NV (US); Jacob Elkins, Reno, NV (US); Qi Zhang, Reno, NV (US)

(73) Assignee: The Board of Regents of The University and Community College System of Nevada on behalf of the University of Nevada, Reno, Reno, NV (US)

( * ) Notice: Subject to any disclaimer, the term of this patent is extended or adjusted under 35 U.S.C. 154(b) by 115 days.

(21) Appl. No.: 10/851,997

(22) Filed: May 20, 2004

(65) Prior Publication Data

US 2005/0116194 A1    Jun. 2, 2005

Related U.S. Application Data

(63) Continuation-in-part of application No. 10/844,040, filed on May 12, 2004.

(60) Provisional application No. 60/471,766, filed on May 20, 2003.

(51) Int. Cl.
*H01F 1/44* (2006.01)
(52) U.S. Cl. ................................. 252/62.53; 252/62.54
(58) Field of Classification Search ..................... None
See application file for complete search history.

(56) References Cited

U.S. PATENT DOCUMENTS 2,589,766 A * 3/1952 Bradley ....................... 277/501
2,719,009 A * 9/1955 Szegvari ...................... 241/16

(Continued)

FOREIGN PATENT DOCUMENTS

| JP | 04-266970 | 9/1992 |
| JP | 05-025316 | 2/1993 |
| WO | WO 02/090105 | * 11/2002 |
| WO | WO 02/090105 A1 | 11/2002 |

OTHER PUBLICATIONS

Grinder, "Rheologgy Controlled By Magnetic Fields", Encyclopedia of Applied Physics, vol. 16, pp. 487-503, 1996.*

(Continued)

*Primary Examiner*—C. Melissa Koslow
(74) *Attorney, Agent, or Firm*—Greenlee, Winner and Sullivan, P.C.

(57) ABSTRACT

Novel magnetorheological elastomer compositions are provided. The magnetorheological elastomers (MREs) may have aligned or randomly arranged magnetizable particles in a thermoset or thermoplastic matrix. The magnetizable particles may be coated to reduce corrosion and/or improve bonding between the particle and the matrix. The magnetizable particles may be flake-shaped. The MREs may have matrices selected from the group consisting of hydrogenated nitrile rubbers, butyl rubbers, ethylene-propylene copolymers and terpolymers, ethylene-acrylic copolymers, fluorinated elastomers, silphenylene-siloxanes, silarylene-siloxanes, poly(carborane-siloxane-acetylene)s and blends thereof. The MREs may also have matrices selected from the group consisting of styrene-butadiene block copolymers, copolyesters, polyamides, polyether block amides, polyolefin-elastomers other than polyalpha olefins, chlorinated polyethylenes, ionomers, chlorosulfonated polyethylenes, blends thereof, and blends of thermoplastic polyurethane with polyvinyl chloride (PVC), polyvinylindene fluoride (PVDF), polycarbonate, or acrylonitrile butadiene styrene (ABS).

16 Claims, 3 Drawing Sheets

U.S. PATENT DOCUMENTS

| | | | | |
|---|---|---|---|---|
| 4,308,155 | A * | 12/1981 | Tada et al. | 252/62.54 |
| 4,336,310 | A * | 6/1982 | Okuyama et al. | 428/447 |
| 4,562,019 | A * | 12/1985 | Inoue | 264/429 |
| 4,618,688 | A | 10/1986 | DePasquale et al. | |
| 4,988,755 | A * | 1/1991 | Dickens et al. | 524/401 |
| 5,290,821 | A | 3/1994 | Sakurai et al. | |
| 5,505,871 | A | 4/1996 | Harder et al. | |
| 5,547,049 | A | 8/1996 | Weiss et al. | |
| 5,578,238 | A | 11/1996 | Weiss et al. | |
| 5,607,996 | A | 3/1997 | Nichols et al. | |
| 5,609,353 | A | 3/1997 | Watson | |
| 5,667,715 | A | 9/1997 | Foister | |
| 5,814,999 | A | 9/1998 | Elie et al. | |
| 5,816,587 | A | 10/1998 | Stewart et al. | |
| 5,974,856 | A | 11/1999 | Elie et al. | |
| 6,183,657 | B1 * | 2/2001 | Saito et al. | 252/62.53 |
| 6,451,221 | B1 * | 9/2001 | Hart et al. | 252/62.54 |
| 6,527,972 | B1 | 3/2003 | Fuchs et al. | |
| 6,544,156 | B2 | 4/2003 | Anderson | |
| 6,695,985 | B2 * | 2/2004 | Igarashi et al. | 252/518.1 |
| 6,872,325 | B2 * | 3/2005 | Bandyopadhyay et al. | 252/62.54 |
| 2002/0000533 | A1 * | 1/2002 | Iyengar et al. | 252/62.55 |
| 2004/0074061 | A1 | 4/2004 | Ottaviani et al. | |
| 2005/0011710 | A1 | 1/2005 | Hitchcock et al. | |

OTHER PUBLICATIONS

Ahn et al. (1997) "Influence of Interchange Reactions on the Miscibility of Polyesterurethanes/Polycarbonate Binary Blends," J. Appl. Poly. Sci 64(12):2363-2369.

Behroozi et al. (1990) "Interaction of Metallized Tubules with Electromagnetic Radiation," *J. Appl. Phys.* 68(7):3688-3693.

Davis, et al. (1996) "Organization of Methoxysilane Molecules on Iron," Int. J. Adhesion and Adhesives 16:5-15.

Demchuk et al. (Mar. 2002) "Viscoelastic Properties of Magnetorheological Elastomers in the Regime of Dynamic Deformation," J. Eng. Phys. Thermophys. 75(2):396-400.

Ginder et al. (1999) "Magnetorheological Elastomers: Properties and Applications, Smart Materials Technologies," Proc. Of SPIE 3675:131-138.

Ginder, J.M., (1996), "Rheology Controlled By Magnetic Fields," Encyclopedia of Applied Physics, 16:487-503.

Harper, C. (2000) *Modern Plastics Handbook*, McGraw-Hill, pp. 4.23-4.25.

Homrighausen et al. (published online Nov. 2001) (2002) "High-Temperature Elastomers from Silarylene-Siloxane-Diacetylene Linear Polymers," J. Poly. Sci. Part A: Poly. Chem. 40:88-94.

Jin et al. (1992) "Optically Transparent, Electrically Conductive Composite Medium," Science 255:446-448.

Kataby et al. (1997), "Self-Assembled Monolayer Coatings on Amorphous Iron and Iron Oxide Nanoparticles: Thermal Stability and Chemical Reactivity Studies," Langmuir 13:6151-6158.

Kataby et al., (1998), "The Adsorption of Monolayer Coatings on Iron Nanoparticles: Mossbauer Spectroscopy and XANES Results," Thin Solid Films 333:41-49.

Kataby et al., (1999), "Coating Carboxylic Acids on Amorphous Iron Nanoparticles," Langmuir 15: 1703-1708.

Keller et al. (1996) "Oxidation Protection of Magnetic Iron Particles by Ultrathin Layer of Silanes," J. Magn. And Magn. Mater. 155:101-103.

Kim et al. (1999) "Dynamic Mechanical and Morphological Studies on the Compatibility of Plasticized PVC/Thermoplastic Polyurethane Blends," J. Appl. Poly. Sci. 71:415-422.

Kolel-Veetil et al. (Mar. 2003) "Synthesis of Elastomeric Poly(Carborane-Siloxane-Acetylene)s," Polymer Preprints 44(1):37-38.

Lauter et al. (May 2003) "Vinyl-Substituted Silphenylene Siloxane Copolymers: Novel High-Temperature Elastomers," *Macromol.* 32:3426-3431.

Lokander et al. (May 2003) "Performance of Isotropic Magnetorheological Rubber Materials," Polymer Testing 22:245-251.

Mishra et al. (2001) "On the Heat Shrinkability and Interchain Crosslinking of Blends Consisting of Grafted Ethylene-Propylene Polymer and Polyurethane Elastomer," Macromol. Mater. Eng. 286(9):516-523.

Naegrer et al. (1990), "Development of Thermoplastic Polyurethane/ABS Blends for Flexible Automotive Bumper Fascia," SAE Special Publications n821(15):900423, pp. 105-119.

Nozawa et al. (1997) "Chemical Modification of Alkanethiol Monolayers for Protecting Iron Against Corrosion," Corrosion Sci. 39(9):1625-1639.

Prozorov et al. (1999) "Effect of Surfactant Concentration on the Size of Coated Ferromagnetic Nanoparticles," Thin Solid Films 340:189-193.

Ramachandran et al. (1996) "Self-Assembled Monolayer Mechanism for Corrosion Inhibition of Iron by Imidazolines," Langmuir 12:6419-6428.

Schlotter et al. (1986), "Formation and Structure of a Spontaneously Adsorbed Monolayer of Arachidic on Silver," Chem. Phys. Lett. 132(1):93-98.

Walsh, P.L. et al. (1992), "A Variable Stiffness Vibration Absorber for Minimization of Transient Vibrations," J. Sound Vibration 158(2):195-211.

Wolpers et al. (1991) "Surface Analytical Investigations of Metal Surfaces Modified by Langmuir-Blodgett Films of Silanes," Appl. Surf. Sci 47:49-62.

Wolpers et al. (1990) "SEM and SAM Imaging of Silane LB Films on Metallic Substrates," App. Surf. Sci. 45:167-170.

Yilgor et al. (2000) "Comparison of Hydrogen Bonding in Polydimethylsiloxane and Polyether Based Urethane and Urea Copolymers," Polymer 41(3): 849-857.

Yu et al. (2000) "Molecular Orientation and Electrochemical Stability of Azobenzene Self-Assembled Monolayers on Gold: An In-situ FTIR Study," Langmuir 16:6948-6954.

Yue et al. (1998) Mechanical Properties and Morphology of Thermoplastic Polyurethane Elastomer with Pol(vinylidene fluoride) Blends, J. Appl. Poly. Sci. 60(4):597-603.

* cited by examiner

TUNABLE MAGNETO-RHEOLOGICAL ELASTOMERS AND PROCESSES FOR THEIR MANUFACTURE

CROSS-REFERENCE TO RELATED APPLICATIONS

This application claims priority from U.S. Provisional Application No. 60/471,766, filed May 20, 2003, and is a continuation-in-part of U.S. patent application Ser. No. 10/844,040 filed May 12, 2004 which are incorporated herein by reference to the extent not inconsistent herewith.

BACKGROUND OF THE INVENTION

This invention is in the field of magneto-rheological elastomers (MREs) and processes for their manufacture.

A magneto-rheological elastomer is comprised of an elastomeric host or matrix material filled with iron or other magnetizable particles. The addition of magnetizable particles to the matrix produces an elastomer whose mechanical properties can be rapidly and continuously controlled with an applied magnetic field. The strength of an MRE can be characterized by its field-dependent modulus. A magneto-rheological elastomer (MRE) is a field-controllable material with tunable stiffness and damping characteristics which makes it useful for vibration isolation and damping applications.

If a magnetic field is applied to the elastomer during curing or solidification and the particles are able to move through the host medium, the magnetizable particles can orient into chains or columns parallel to the direction of the magnetic field (Ginder, J. M., Nichols, M. E., Elie, L. D., Tardiff, J. L., (1999), "Magnetorheological Elastomers: Properties and Applications, Smart Materials Technologies," Ed. by M. Wuttig, Proc. of SPIE Vol. 3675, 131-137). As the elastomer cures or solidifies, the aligned magnetizable particles are locked into place and are ready for activation when installed in a device that can energize the material with a magnetic field. Under the influence of a magnetic field, dipole moments are induced in the magnetizable particles resulting in an increase or decrease in stiffness and damping or dimensions of the composite material depending on magnetic field strength.

A variety of elastomers, as well as other polymers, have been proposed as matrices for magnetizable particle-elastomer composites. Magnetizable particles were cured in silicone elastomers to produce transparent sheets whose conductivity along the field direction was extremely sensitive to pressure and used these sheets in touch-screen panels. (S. Jin, T. Tiefel, R. Wolfe, R. C. Sherwood, J. J. Mottine, Science 255, 446-448, 1992). Highly anisotropic magnetizable particles were dispersed in rigid epoxies to produce highly anisotropic dielectric materials for microwave frequencies (F. Behroozi, M. Orman, R. Reese, W. Stockton, J. Calvert, F. Rachford, P. Schoen, 1990) Ginder et al. describe MREs having micrometer-sized carbonyl iron particles embedded in natural rubber (Ginder, J. M., Nichols, M. E., Elie, L. D., Tardiff, J. L., (1999), "Magnetorheological Elastomers: Properties and Applications, Smart Materials Technologies," Ed. by M. Wuttig, Proc. of SPIE Vol. 3675, 131-137). Shiga et al identify rubber as a carrier material (English abstract of Japanese publication 04-266970, English abstract of Japanese publication 05-025316A). Elie et al (U.S. Pat. No. 5,974,856) list natural rubber, silicone, polybutadiene, polythethylene, polyisoprene, polyurethane and the like as elastomeric carrier materials. Viera et al. (WO 02/09015) list natural rubber, silicone, polybutadiene, polyethylene, styrene butadiene rubber (SBR) nitrile rubber, polychloroprene, polyisobutylene, synthetic polyisoprene, and blends thereof as elastomeric carrier materials. Ottaviani et al. (U.S. Publication 2004/0074061) list elastomeric polymer matrices of polyalpha-olefins, natural rubber, silicone, polybutadiene, polyethylene, polyisoprene, polyurethane, and the like, and combinations.

SUMMARY OF THE INVENTION

The invention provides magnetorheological elastomers and methods for their manufacture. The magnetorheological materials of the invention can be used for vibration isolation applications. The magnetorheological materials of the invention can have improved oxidative resistance, thermal oxidative resistance, high temperature resistance, ozone resistance, moisture resistance, and seawater resistance as compared to more conventional magnetorheological materials.

For magnetorheological materials, the magnetizable particles are typically iron or other magnetizable materials or alloys. These elastomers contain magnetizable particles with particle sizes from about 0.01 to about 700 microns. Magnetizable particles may be present at between about 10 to about 95% by weight of the material. The amount of magnetizable particles should be sufficient to provide the required on-state mechanical properties, preferably 50-90%, more preferably 60-80% weight percent, based on the total weight of the magnetorheological material.

In an embodiment, the magnetizable particles may be coated for corrosion protection and/or improvement of the bonding between the particle and the matrix.

In an embodiment, the MRE materials of the invention are made by mixing the magnetizable particles with the elastomer and applying a magnetic field to the material while the elastomer cures or solidifies. If the elastomer is a multi-component system, the magnetizable particles may be mixed with the elastomer by mixing the particles with one or more components of the elastomer, and then mixing in the other components of the elastomer.

The process of orienting the magnetizable particles during elastomer cure or solidification can be important to producing MREs with controllable behavior. A magnetic field of uniform magnetic flux can be passed through the MRE in a direction that is desirable for the final device application for a period of time sufficient to allow the base matrix to cure or solidify, locking the aligned magnetizable particle chains into place. For thermosetting polymers, the solidification can take place in a compression or reaction injection mold. For thermoplastic elastomers, the curing can take place in a compression or injection mold.

Once the MRE is prepared, it can be installed in a device that can activate the suspended magnetizable particle chains via an increase in applied magnetic field strength. The application of magnetic field strength increases the material's stiffness and damping characteristics in a way that will change the device's ability to store and dissipate mechanical energy.

DETAILED DESCRIPTION OF THE INVENTION

Figure 1:
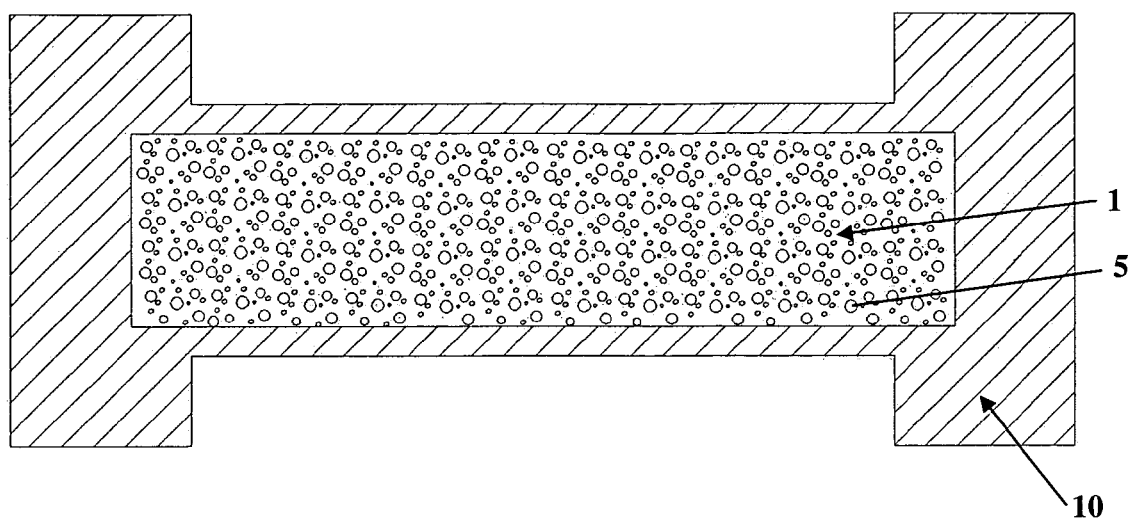
FIG. 1 schematically illustrates molding of a magnetorheological elastomer with nonaligned magnetizable particles.

Magnetorheological Elastomers (MREs) are viscoelastic composites which are comprised of conventional elastomeric matrix materials filled with iron or other magnetizable particles. The matrix surrounds and binds together the magnetizable particles. These intelligent materials are characterized by their mechanical properties, such as stiffness and damping, which can be continuously and rapidly controlled by an applied magnetic field.

As used herein, an elastomer is a material which has an elastic elongation greater than about 200%. The elastic elongation may be as high as 1000%. In an embodiment, the elastomer is not a gel. Matrices suitable for magnetorheological materials include both thermoset and thermoplastic elastomers. As used herein, a thermoplastic can be reshaped by heating once it has been molded. In an embodiment, a thermoplastic elastomer does not form a substantial amount of covalent crosslinks between polymer chains. In another embodiment, a thermoplastic elastomer may comprise a matrix which is not substantially covalently crosslinked and regions of thermoset material distributed in the matrix (e.g. a thermoplastic vulcanizate or TPV). As used herein, a thermoset forms covalent crosslinks between the polymer chains during curing. After curing, heating of a thermoset part may soften the part, but the part will retain its general shape until decomposition begins.

Thermoset elastomers suitable for use in magnetorheological elastomers include polyisoprenes, polychloroprenes, hydrogenated nitrile rubbers, styrene butadiene rubbers (SBR), acrylonitrile butadienes (NBR), isobutylene isoprenes (IIR), polymethylsiloxanes, hydrocarbon elastomers, polyurethanes, ethylene/acrylic elastomers, perfluoroelastomers, fluorocarbons, silphenylene-siloxanes, silarylene-siloxanes, poly(carborane-siloxane-acetylene)s and blends thereof. Table 1 lists exemplary trade names and manufacturers for some of these elastomers.

As used herein, a blend is a combination of polymers, after they have formed, in such as way that the resultant polymer material is two or more phases. In contrast, a copolymer is a combination of two or more types of monomers such that the resulting polymer contains some of each of the types of monomer. As used herein, copolymers include terpolymers, which combine three polymers. An alloy is a combination of polymers, after they have formed, or of a polymer and a monomer, into a single-phase, homogeneous polymer material.

TABLE 1

Commercially Available Thermoset Elastomers

| Chemical Description | Trade Name | Manufacturer | Temperature Range (° C.) |
| --- | --- | --- | --- |
| Polyisoprene (Natural Rubber; Synthetic) | Gum Rubber; BUNA-S | | −50~82 |
| Polychloroprene | NEOPRENE; BAYPEN | Dupont Dow | −40~115 |
| Hydrogenated Nitrile Rubber | HNBR | Dupont Dow | −40~150 |
| Styrene Butadiene Rubber (SBR) | AUSTRAPOLI; ASRC, JSR, NIPOL; BUNA-S | Zeon Chemicals Inc. | −55~90 |
| Acrylonitrile Butadiene (NBR) | BUNA-N; PREBUNAN; HYCAR; NIPOL; KRYNAC | B F Goodrich; Zeon Chemicals Inc. Polysar | −34~110 |
| Isobutylene Isoprene(IIR) | Butyl | | −46~148 |

TABLE 1-continued

Commercially Available Thermoset Elastomers

| Chemical Description | Trade Name | Manufacturer | Temperature Range (° C.) |
| --- | --- | --- | --- |
| Polymethylsiloxane (VMQ) | Silicone | General Electric | −100~316 |
| Hydrocarbon Elastomer (EPDM) | Nordel | Dupont Dow | −45~148 |
| Polyurethane | ADIPRENE | Uniroyal Chemical | −68~103 |
| Ethylene/acrylic Elastomer | Vamac | Dupont Dow | −20~160 |
| Perfluoroelastomer | Kalrez | Dupont Dow | −50~315 |
| Fluorocarbon | VITON; Fluorel | Dupont Dow | −23~260 |

In an embodiment, the elastomer is selected from the group consisting of hydrogenated nitrile rubbers, butyl rubbers, ethylene-propylene copolymers and terpolymers, ethylene-acrylic copolymers, fluorinated elastomers, silphenylene-siloxanes, silarylene-siloxanes, poly(carborane-siloxane-acetylene)s and blends thereof.

In another embodiment, the elastomer is selected from the group consisting of fluorinated elastomers, silphenylene-siloxanes, silarylene-siloxanes, poly(carborane-siloxane-acetylene)s and blends thereof.

In another embodiment, the thermoset is a hydrocarbon polyol based polyurethane having hydrolytic resistance superior to that of polyester or polyether based polyols.

Hydrogenated nitrile rubber (HNBR) is achieved by hydrogenating nitrile butadiene rubber (nitrile rubber, NBR) whereby the double links in the NBR main chain become saturated. HNBR materials have better thermal and chemical stability than NBR.

Isobutylene-isoprene copolymers and terpolymers are commonly termed butyl rubber (IIR). Butyl rubbers may also be halogenated.

Hydrocarbon elastomers include ethylene-propylene copolymers (EPM) and terpolymers (EPDM). The terpolymer is formed from ethylene, propylene, and a diene.

Ethylene/acrylic elastomers include ethylene-acrylic copolymers and terpolymers. Vamac is a family of thermoset ethylene-methyl acrylate (EMA) copolymers and terpolymers.

Fluorinated elastomers include fluoroelastomers and perfluoroelastomers. Fluorinated elastomers can be copolymerized with copolymers and terpolymers of tetrafluoroethylene, hexafluoroethylene, and vinylidene fluoride. Fluorinated elastomers are vulcanizable rubber gums which need to be compounded prior to molding.

Typically, polyurethanes are produced by reaction of a polyether or polyester polyol with a diisocyanate. Hydrocarbon polyol based polyurethanes are prepared by reaction between hydrocarbon polyols and diisocyanates. Hydrocarbon polyols include hydroxyl terminated polybutadienes and epoxidized polybutadiene resin. Reaction of hydroxyl terminated polybutadienes with functionality greater than 2 with polymeric MDI isocyanate results in thermosetting urethanes. A variety of hydrocarbon polymers are available from Sartomer. For example R-45HTLO has hydroxyl functionality in the range 2.4-2.6 with molecular weight of 2800, R-45M has functionality 2.2-2.4, R-20LM has molecular weight of 1200, 600E is an epoxidized polybutadiene resin—equivalent weight—460, and 605E is an epoxidized polybutadiene resin—equivalent weight—300. Hydrocarbon based polyurethanes have excellent load-bearing capability in both tension and compression as compared to conventional elastomers, good impact resistance; low temperature resistance, good adhesion, high resistance to degradation by atmospheric oxygen, high hydrolytic stability, good ozone and chemical resistance, low moisture permeability and low toxicity.

TDI-terminated polyether based (PTMEG) urethanes are also useful for the present invention. Commercially available hydroxyl terminated polybutadienes include Poly BD R45 HTLO, (Sartomer Company). Commercially available TDI terminated polyethers include ADIPRENE L100 (Uniroyal Chemical). PTMEG has excellent hydrolytic resistance, as well as good performance at low temperature, good water resistance, weather resistance, oxygen and ozone resistance, fungus resistance, oil, chemical and solvent resistance, provides electrical insulation, radiation resistance, and has low outgassing.

Blends of silicone and urethane can produce thermoset elastomers. In an embodiment, the blend is a thermoset material produced by a polyether polyol/polymeric MDI (PMDI)/polydimethyldisiloxane (PDMS) or a PTMEG/PMDI/polydimethylsiloxane (PDMS). Silicone/urethane blends offer a compromise between the high temperature performance of the silicones and the controllable mechanical properties of polyurethanes. In an embodiment, the ratio of silicone to polyurethane is about 10% by mass silicon and about 90% by mass polyurethane.

Other useful blends include copoly(urethane-urea) with polydimethylsiloxane (Yilgor, E. Buigaz, E. Yurtsever, E. Yilgor, I. Polymer, Vol.41 Issue:3, February, 2000, 849-857) and urethane with ethylene-propylene polymers (J. K. Mishra, S. Gupta, S. Raychowdhury, C. K. Das, On the Heat Shrinkability and Interchain Crosslinking of Blends Consisting of Grafted Ethylene-Propylene Polymer and Polyurethane Elastomer, Macromolecular Materials and Engineering, Vol.286, Issue 9, 516-523(2001)). The ethylene-propylene polymers may have other moieties grafted to them.

Siloxane based copolymers include silphenylene-siloxane (Ulrich Lauter, Simon W. Kantor, Klaus Schmidt-Rohr, William J. MacKnight, Macromolecules, 1999, 32, 3426-3431), silarylene-siloxane-diacetylene (Craig L. Homerighausen, Teddy M. Keller, Journal of Polymer Science, Part A: Polymer Chemistry, Vol. 40, 2002, 88-94), and Poly(carborane-siloxane-acetylene) (Manoj K. Kolel-Veetil and Teddy M. Keller, Polymer Preprints, 2003, 44(1), 37). As shown in Table 2, the upper boundary on use temperature for these materials is in excess of 200° C., and in some cases exceeds that of ordinary silicones.

TABLE 2

Non-commercially Available Elastomers

| Chemical Description | Temperature Range (High temperature ° C.) |
|---|---|
| Blends of polydimethylsiloxane and copoly(urethane-urea) | |
| Silphenylene siloxane copolymers | 230 |
| PVC/thermoplastic urethane | |
| ethylene-propylene/polyurethane blends | 166 |
| Thermoplastic polyurethane/PVDF | |
| Thermoplastic polyurethane/polycarbonate | 230 |
| Thermoplastic polyurethane/ABS | |
| Silarylene-siloxane-diacetylene | 350 |
| Poly(carborane-siloxane-acetylene) | 400 |

Thermoplastic elastomers suitable for use include styrene-butadiene block copolymers, copolyesters, polyurethane, polyamide, polyester-ether copolymer, polyether block amides, polyolefin elastomer, polyurethane, polysulfone and polyethersulfone, chlorinated polyethylene, ionomers, chlorosulfanated polyethylene and blends thereof. Table 3 lists exemplary trade names and manufacturers for these materials. In an embodiment, the thermoplastic is selected from the group consisting of styrene-butadiene block copolymers, copolyesters, polyamides, polyether block amides, polyolefin-elastomers other than polyalpha olefins, chlorinated polyethylenes, ionomers, chlorosulfonated polyethylenes, blends thereof, and blends of thermoplastic polyurethane with polyvinyl chloride (PVC), polyvinylindene fluoride (PVDF), polycarbonate, or acrylonitrile butadiene styrene (ABS).

TABLE 3

Commercially Available Thermoplastic Elastomers

| Chemical Description | Trade Name | Manufacturer | Temperature Range (° C.) |
|---|---|---|---|
| Styrene/butadiene block copolymers | TUFPRENE ASAPRENE | AK Elastomer | Tm: 90-165° C. |
| Copolyesters | HYTREL | Dupont Dow | Tm: 130° C. |
| Polyurethane | ELASTHANE | Polymer Technology Group | Tm: 90-190° C. |
| Polyamide | VESTAMID | Creanova, Degussa-Huls | Tm: 120-275° C. |
| Polyester-ether copolymer | Ecdel; Arnitel; Pelprene | Eastman Chemical; DSM Engineering; Toyobo | -40~200 |
| Polyether block amides | PEBAX | Atofina | -46~148 |
| Polyolefin Elastomer | ENGAGE; PLASTOMER | Dupont Dow | -40~135 |
| Polyurethane | PELLETHANE | Dow | -68~103 |
| Chlorinated polyethylene | Tyrin | Dupont Dow | -35~150 |
| | Santoprene | Advanced Elastomer Systems | -60~135 |
| Ionomers | Alcryn; Formion; Surlyn | Ferro; A. Schulman; Dupont Dow | -30~140 |
| Chlorosulfonated polyethylene | Hypalon; Acsium | Dupont Dow | -45~150 |

Styrenic block copolymers include styrene-butadiene (SB), styrene-butadiene-styrene (SBS), styrene-ethylene-butylene-styrene(SEBS), and styrene isoprene styrene (SIS).

Copolyesters or polyester based thermoplastic elastomers are segmented copolymers whose composition can be described as a [A-B-]n- structure with the A representing an aliphatic polyether or aliphatic polyester segment and the B representing an aromatic polyester segment. These copolymers can also be termed polyester ether copolymers, COPE or thermoplastic etheresterelastomers (TEEEs) Commercially available polyester copolymer include: Ecdel 9965-7 (Eastman Chemical), Arnitel PL380, PM381 (DSM Engineering), Pelprene 150BT (Toyobo) and HYTREL (Dupont).

Thermoplastic polyurethanes are typically produced by reacting a diisocyanate with long chain diols such as liquid polyester or polyether polyols and adding a chain extender. Thermoplastic polyurethanes are also useful in blends with other thermoplastic materials.

Polyamide TPEs can be polyester amides, polyetherester-amide block copolymers or polyether block amides. Polyether/polyester block amide (PEBA) is characterized by soft segments which have either a polyether or polyester backbone. The amide linkages between the hard and soft segments of the block copolymer are more resistant to chemical attack than either an ester or urethane bond. In the soft segments, polyether chains give better resistance to hydrolysis than polyester chains. In many characteristics, block copolymeric PEBA is superior to other thermoplastic elastomer. PEBA's made of nylons with more methylene groups (nylon 12 vs nylon 6) have better moisture resistance. They have a high temperature limit of about 170° C. Several commercially available PEBA's include: Pebax MV1074 (Atochem), Grilamid (EMS-American Grilon) and Vestimid (Creanova, Degussa-Huls).

Polyolefin elastomers are typically composed of combinations of EPM or EPDM and polypropylene. In an embodiment, the polyolefin elastomer is not a polyalpha olefin.

Ionomers are copolymers containing both nonionic repeat units, and ionic repeat units (usually less than 15% of the polymer). Normally the polymer backbone chain will be nonpolar. The ionic attractions that result strongly influence the polymer properties. Random polar ionic groups tend to cluster together away from the nonpolar backbone chains. The nonpolar polymer backbone chains will group together, and the polar ionic pendant groups will cluster together forming a reversible crosslink. The link is ionic, therefore the ionic clusters break up easily when heated. The high temperature limit for ionomers is typically ~180° C. Several commercially available include: Alcryn (Ferro), Formion (A. Schulman) and Surlyn 8500, 8600, 9500, 9600 series (Du Pont).

Chlorosulfonated polyethylene is a saturated chlorohydrocarbon rubber produced from $Cl_2$, $SO_2$, and a number of polyethylenes, and containing from 20%-40% chlorine and 1-2% sulfur as sulfonyl chloride.

Elastomeric blends include blends of thermoplastic elastomers with thermoplastics. Several useful elastomer blends that are not commercially available are listed in Table 2. Thermoplastic polyurethane may be blended with thermoplastic materials such as PVC (Y. Kim, W. J. Cho, C. S. Ha, Dynamic Mechanical and Morphological Studies on the Compatibility of Plasticized PVC/Thermoplastic Polyurethane Blends, *Journal of Applied Polymer Science, Vol.* 71, 415-422 (1999)), PVDF (M. Z. Yue, K. S. Chian, Mechanical properties and morphology of thermoplastic polyurethane elastomer with pol(vinylidene fluoride) blends, *Journal of Applied Polymer Science, Vol.* 60, Issue 4, 597-603 (1998), polycarbonate (T. O. Ahn, S. Jung, J. Lee, H. M. Jeong, Influence of Interchange Peactions on the Miscibility of Polyesterurethanes/Polycarbonate Binary Blends, *Journal of Applied Polymer Science*, 64, 12, Jun. 20, 1997, p 2363-2369), and ABS (M. D. Naegrer, M. F. Player, D. E. Henton, Development of thermoplastic polyurethane/ABS blends for flexible automotive bumper fascia, *SAE Special Publications*, n 821, 1990, 15p 900423).

Polysulfones (PSU) and polyethersulfones (PES) may also be used in blends. Commercially available polysufones and polyethersulfones include Ultrson S(PSU) and Ultrason E (PES) from BASF. Constant use temperatures are 160° C. (PSU) and 180° C. (PES).

The MREs of the invention may optionally include additives. Additives useful in aspects of the invention include:

1) Processing aids
2) Accelerators and activators
3) Anti-ozonants
4) Vulcanizing agents
5) Retardants/inhibitors
6) Anti-degradants
7) Fillers and
8) Softeners ("Rubber Technology," Third Edition, Maurice Morton, Editor, Chapman and Hall, Publisher, 1995.)

The magnetizable particles may be iron or another magnetizable material or alloy. In an embodiment, the magnetizable particles are carbonyl iron. In this embodiment, iron purities are from about 95 to about 99.9%, preferably from about 97 to about 99.8% where carbon content is minimized.

Other compositions of magnetizable particles may be used in the practice of the invention. Table 4 lists commonly available ferrous (iron containing) metals and alloys. From the table, it is evident that several soft magnetic alloys are available which provide for higher saturation magnetization and permeabilities than commercially available carbonyl iron. Several of these alloys are commercially available (READE Advanced Materials) as a powder with micron and submicron diameter ranges. Also, alloys in bulk metal are also available. There are a variety of methods to custom shape these bulk metals into powders (ball milling, high speed attrition, etc.). These alloys can be incorporated into the elastomer material with the goal to maximize the controllable dynamic range of the finished MRE.

The particle size can affect the performance of the MRE. The literature suggests that using larger particles in the MRE can have a noticeable effect on the gain modulus of the elastomer (S. A. Demchuk, J. Eng. Physics and Thermophysics, Vol. 75, 2, 2002, 396-400). Having a system with a bimodal size distribution of particles can also affect performance. This bimodal distribution system can be advantageous due to the multiple magnetic domains within the system. In different embodiments, the particle size is from about 0.01 microns to about 700 microns, from about 3 microns to about 600 microns, from about 50 to about 200 microns, from about 0.5 to about 100 micron, from about 1 to about 10 microns, or from about 3 to about 5 microns. In another embodiment, the particles comprise particles from 10 nm to 100 nm, used either alone, or in combination with micron sized particles (e.g. 3-600 microns, 50-200 microns, 1-10 microns, 3-5 microns.)

The particle shape can also affect the performance of the composite. A variety of particle shapes can be used including acicular, spherical, octahedral, cubic and flake shaped. In an embodiment, the magnetizable particles are flake shaped. As used herein, flake-shaped particles have a thickness significantly less than their width and length. Flake shaped particles are desirable due to large particle domains, and very large surface area to volume ratio. Also, adhesion properties can be improved with a flake-shaped particle in addition to increased gain modulus, durability and dynamic range.

Flake shaped particles may be obtained commercially or synthesized by mixing magnetizable particles with an elastomer and casting it into a thin film. The resulting film can then be custom cut and shaped. This method of producing flake shaped particles can allow manufacture of larger particle sizes. In an embodiment, the elastomer used to produce these flake shaped particles is chosen to be the same as the matrix of the composite. The elastomer matrix serves as an additional coating on the particles, improving the material characteristics.

TABLE 4

Properties of Magnetizable Metals and Alloys

| MATERIAL | COMPOSITION (mass %) | $\mu_i/\mu_o$ | $\mu_m/\mu_o$ | $H_c$ (A m$^{-1}$) | $J_s$ (T) | $W_H$ (J m$^{-3}$) | $T_c$ (K) |
|---|---|---|---|---|---|---|---|
| Iron | Commercial 99Fe | 200 | 6000 | 70 | 2.16 | 500 | 1043 |
| Iron | Pure 99.9Fe | 25000 | 350000 | .8 | 2.16 | 60 | 1043 |
| Silicon Iron | 96Fe-4Si | 500 | 7000 | 40 | 1.95 | 50 | 1008 |
| Silicon Iron | 97Fe-3Si | 9000 | 40000 | 12 | 2.01 | 35 | 1015 |
| Mild Steel | Fe-.1C-.1Si-.4Mn | 800 | 1100 | 200 | | | |
| Hypernik | 50Fe-50Ni | 4000 | 70000 | 4 | 1.6 | 22 | 753 |
| Deltamik | 50Fe-50Ni | 500 | 200000 | 16 | 1.55 | | 773 |
| Isoperm | 50Fe-50Ni | 90 | 100 | 480 | 1.6 | | |
| 78 Permalloy | 78Ni-22Fe | 4000 | 100000 | 4 | 1.05 | 50 | 651 |
| Supermalloy | 79Ni-16Fe-5Mo | 100000 | 1000000 | .15 | .79 | 2 | 673 |
| Mumetal | 77Ni-16Fe-5Cu-2Cr | 20000 | 100000 | 4 | .75 | 20 | 673 |
| Hyperco | 64Fe-35Co-.5Cr | 650 | 10000 | 80 | 2.42 | 300 | 1243 |
| Permendur | 50Fe-50Co | 500 | 6000 | 160 | 2.46 | 1200 | 1253 |
| 2V-Permendur | 49Fe-49Co-2V | 800 | 4000 | 160 | 2.45 | 600 | 1253 |
| Supermedur | 49Fe-49Co-2V | | 60000 | 16 | 2.4 | 1150 | 1253 |
| 25Perminvar | 45Ni-30Fe-25Co | 400 | 2000 | 100 | 1.55 | | |
| 7Perminvar | 70Ni-23Fe-23Co | 850 | 4000 | 50 | 1.25 | | |
| Perminvar | 43Ni-34Fe-23Co | | 400000 | 2.4 | 1.5 | | |
| Alfenol | 84Fe-16Al | 3000 | 55000 | 3.2 | .8 | | 723 |
| Alfer | 87Fe-13Al | 700 | 3700 | 53 | 1.2 | | 673 |
| Aluminum-Iron | 96.5Fe-3.5Al | 500 | 19000 | 24 | 1.9 | | |
| Sendust | 85Fe-10Si-5Al | 36000 | 120000 | 1.6 | .89 | | 753 |

$\mu_i$ is the initial permeability
$\mu_m$ is the maximum permeability
$H_c$ is the coercive force
$J_s$ is the saturation polarization
$W_H$ is the hysteresis loss per cycle
$T_c$ is the Curie temperature The use of coated or pretreated ferrous particles can prevent oxidation of the iron in the particles. These coatings can improve composite durability and corrosion resistance. Coatings can also be used to improve the bonding between the particle and the composite. Suitable coatings include various silanes (e.g., isobutyl trimethoxysilane), $SiO_2$ coatings, as well as iron oxide coatings. Silane coatings can be polymer coatings. Other suitable polymer coatings are coatings of the matrix polymer or other polymers compatible with the matrix polymer. Suitable silanes include those with functional groups compatible with the polymer matrix. As is known to the art, functionalized silanes include those with vinyl, amino, isocyanato, methacryloyloxy, acryloyloxy, epoxy, or mercapto groups. In an embodiment, the coating is a multilayer coating.

Silane coated particles may be further treated with a surfactant. The purpose of the surfactant is three-fold. First, the addition of the surfactant coating on the silane treated particles may further improve the particle's protection against oxidation. Second, the surfactant may decrease bulk agglomeration and improve homogeneity in the MRE. Third, that the surfactant additive may improve particle bonding and interaction in the elastomer.

Coatings which decrease the oxidation rate of the particles can improve the stability and performance of the material. Iron particles can oxidize quickly when exposed to water or humid environments. The iron oxides that result are no longer ferromagnetic (the oxides are ferrimagnetic), and thus a dramatic loss of magnetization occurs in the elastomer when oxidized [Keller, H., Rengel, H., Poganiuch, P., "Oxidation protection of magnetic iron particles by ultrathin layers of silanes," *Journal of Magnetism and Magnetic Materials* 155 (1996) 101-103.]. Silanes have been shown to provide oxidation protection and prevent loss of magnetization (Keller. J. of Magnetism and Magnetic Materials, 1996). Silanes are also known to the art as coupling agents (C. Harper, Modern Plastics Handbook, (2000), McGraw-Hill).

For thermoplastic elastomers, processing of the materials can be done by mixing the magnetizable particles with the molten thermoplastic and then transferring the elastomer melt to a mold. The molten thermoplastic can be solidified in a compression or injection molds with magnets to allow the materials to be cured or crystallized under the influence of the magnetic field.

FIG. 1 schematically illustrates molding of an elastomer 1 in mold 10 when no magnetic field is applied. The magnetizable particles 5 are randomly distributed, rather than aligned.

Figure 2:
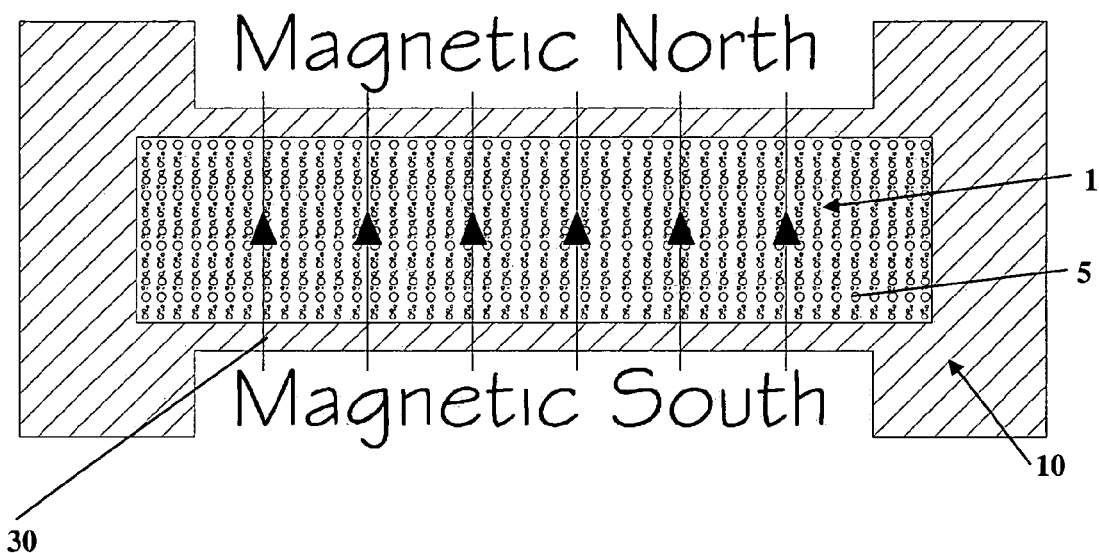
FIG. 2 schematically illustrates molding of a magnetorheological elastomer with magnetizable particles aligned by application of a magnetic field.

FIG. 2 schematically illustrates molding of an MR elastomer in a mold when a magnetic field is applied. If a magnetic field is applied during solidification by a source of magnetic field (not shown), the magnetizable particles 5 align along the field lines 30 of the magnet. The source of magnetic field may be any source as known to the art, including permanent and electromagnets. In an embodiment, the magnetizable particles are substantially aligned. Substantial alignment of the particles is reflected in a change in modulus of the MRE.

Alternately, the processing can be done by first compounding the magnetizable particles into the elastomers. This can be done using a single or twin screw extruder. Pellets containing 50-90 wt % of magnetizable particles can be compounded for molding.

For thermoset systems with two or more components (for example, a resin and a hardener component), the magnetizable particles are typically mixed with at least one of the components before mixing with the other components. For example, in making a polyurethane-silicone polymer blend the magnetizable particles can be mixed with a mixture of a chain extender and one part of a two part silicone resin. This mixture can then be combined with a mixture of an isocyanate and the second part of the two part silicone resin.

During solidification or curing of the composite, a magnetic field is applied to align the magnetizable particles into chains or columns parallel to the direction of the magnetic field. Typically, the field is applied either parallel or perpendicular to the desired direction of deformation of the MRE part during use. In other words, the chains are formed parallel to an expected compressive or tensile load; or perpendicular to a shear load.

The off-state performance of the composite, when no magnetic field is applied, is influenced by the base elastomer and the loading of magnetizable particles (high particle content typically results in higher off-state stiffness). The magnetic field strength during solidification or curing is also an important parameter in establishing the off-state performance. The magnetic field strength can be adjusted during solidification or curing to get additional off-state performance. For a given composite system, higher field strengths during curing typically result in a higher off-state stiffness.

In an embodiment, the field strength is selected so as to maximize the dynamic range. The dynamic range is the ratio of the on-state force to the off-state force. Optimum particle alignment gives maximum dynamic range. During the molding process, there may be different optimal magnetic field strengths for different MRE materials to obtain the greatest controllable stiffness range for the "on" and "off" states.

In an embodiment, magnetic field during solidification or curing can be varied from 0 to 1.5 Tesla. In other embodiments, the magnetic field strength is between 0.2 and about 0.6 Tesla or is about 0.4 Tesla.

A variety of molding techniques may be used in the practice of the invention.

1) In compression molding the material to be molded is inserted into the compression mold and the mold is closed and heated to promote cure. In the case of MREs, the magnetic field is activated during cure or solidification, and the particles allowed to orient during the curing process.

2) In transfer molding material is transferred from an external location into the transfer mold to reduce cycle time. As in compression molding, for MREs the magnetic field is activated during cure or solidification, and the particles allowed to orient during the curing process.

3) Injection molding is ideally suited for fast cycle times and complex molding shapes for thermoplastic elastomers. The material is softened by screw rotation and heating in the barrel/screw section of the machine and then injected into the mold. The mold is designed for magnetic activation to allow particle orientation during crystallization.

4) Extrusion is also well suited for thermoplastic elastomers. In extrusion techniques, the material is extruded from the barrel/screw region of the extruder and an external magnetic field is used to orient the particles as they exit the extruder.

The reproducibility of the MRE can be improved by using mold designs which reduce or eliminate entrained air bubbles, as well as standardizing all initial conditions of the elastomer synthesis (i.e., initial temperature of raw materials, mold device, etc.).

EXAMPLE 1

Polyurethane/Silicone Magnetorheological Elastomer Blends

Polyurethane/silicone blends are prepared which contain a mixture of polyether polyol, polyester polyol or polyethylene glycol and vinylpolydimethylsiloxane (VPDMS) resin with molecular weight of approximately 10,000 and containing a platinum catalyst. Dimethylmethylhydrogenpolysiloxane (DMMHPS) which has a molecular weight of approximately 10,000 is mixed with polymethylene polyphenyl isocyanate (PMDI) which has a functionality of 2.7 and an equivalent weight of 134.

Where MRE processing occurs by:

Step 1: Add 60-90 wt % of micron size carbonyl iron particles to the polyol/VPDMS resin mixture and mix at 1000 rpm for 10 minutes.

Step 2: Add the mixture of DMMHPS/PMDI and continue mixing at 1000 rpm for 2 minutes.

Step 3: Transfer mixture to compression or reaction injection mold which is designed to cure under a magnetic field.

Step 4: Cure for approximately 4 hours while under the presence of a magnetic field.

EXAMPLE 2

Thermoplastic Co-Polyester Magnetorheological Elastomer

Where MRE processing occurs by:

Step 1: Melt copolyester thermoplastic elastomer

Step 2: Add 50-90 wt % of micron size carbonyl iron particles to thermoplastic elastomer melt.

Step 3: Mix the melt under high shear for 10 minutes.

Step 4: Transfer the thermoplastic elastomer melt to a compression or injection mold which is designed to crystallize under a magnetic field.

Step 5: Allow the system to crystallize while under the presence of a magnetic field.

Step 6: Cool for 1 hour while under the presence of a magnetic field and remove material from mold.

EXAMPLE 3

Preparation of a Polybutadiene-Polyol Based Polyurethane

The polybutadiene polyol based polyurethane (Poly BD-polyurethane) MRE is prepared by reaction between the hydrocarbon polyol and polymeric MDI isocyanate. The polyol is hydroxyl terminated polybutadiene (Poly BD R-45 HTLO, Sartomer Company, Exton, Pa.), which has an average molecular weight of 2800 and a functionality of 2.4-2.6. The isocyanate used is polymethylene polyphenyl isocyanate (p-MDI, Dow PAPI 27), which has a functionality of 2.7 and the equivalent weight is 134.

The weight ratio of polyol to isocyanate is 8.4:1. The magnetizable particles are dried before use.

Step 1: Add 50-70 wt % micron size carbonyl iron particles to poly bd polyurethane elastomer and mix completely.

Step 2: Add polymethylene polyphenyl isocyanate of polyurethane elastomer with weight ratio 1:8.2 Poly BD.

Step 3: Stir the mixture at 1000 rpm for 5 minutes.

Step 4: Pour the mixture into the mold with gaskets between the aluminum sheets and cure the system applying the magnetic field.

The mechanical properties of Poly BD-polyurethane-MRE can be investigated using a micromechanical testing instrument (Perkin Elmer, DMA-7e). A 20 mm aluminum probe spacer insures that the magnet is a sufficient distance from the measuring elements so as not to interfere with force and strain measurement.

Figure 3:
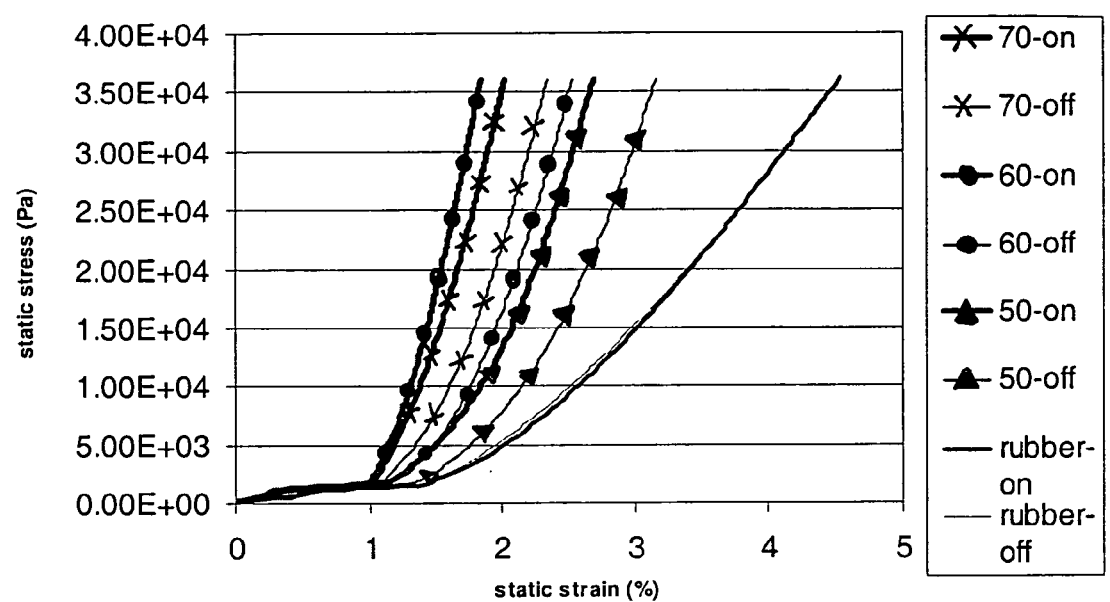
FIG. 3 illustrates the effect of different magnetic particle concentrations on the static compressive stress-strain properties of several MR elastomers and an elastomer matrix (without magnetic particles).

FIG. 3 illustrates the effect of different magnetic particle concentrations on the static compressive stress-strain properties of MR polybutadiene polyol based polyurethane elastomers and an elastomer matrix (without magnetic particles). On-state (magnetic field applied) and off-state (no magnetic field applied) curves are shown. The magnetizable particles were iron carbonyl particles between about 3 and about 7 microns. The percentages of iron particles shown are weight percentages. The particles were oriented during curing at a field strength of about 0.4-0.5T. This data indicates that the instrument is effectively magnetically isolated as demonstrated by the curve for the rubber material, which contains no magnetic particles. These results indicate that significant increase in elastomer stiffness results from activation of the MRE. The MRE with higher concentration of magnetic particles has a higher stiffness than the lower concentration. The compressive force range is defined as the ratio of the static stress of the on-state to that of the off-state. The compressive force ranges for the 50%, 60% and 70% iron particle material are approx. 70%, 200%, and 60% respectively. The optimum concentration of iron particles for these materials was therefore about 60%.

EXAMPLE 4

Flake-Shaped Particles

Flake-shaped iron carbonyl particles (S-Flakes) can be obtained from BASF. The particle size is between about 3 and about 560 microns. The tap density is about 4.2 gm/cm$^3$.

The approximate chemical composition of these particles is as follows:

Iron: >99.5%
Carbon: <0.1%
Oxygen: <0.6%
Nitrogen: <0.05%

These particles can combined with an elastomer with a loading of about 70% by mass (about 23-30% by volume) and cured or solidified at a magnetic field of 0.4-0.5 T.

EXAMPLE 5

Silane Coating of Particles

The particles were treated in several steps. First, the particles were passivated by water to ensure that the surface of the particles was fully hydrated. Such a process leads to the surface passivation with a thin layer of FeOOH [Davis, S., Watts, J., "Organization of methoxysilane molecules on iron," *International Journal of Adhesion and Adhesives* 16(1996)5-15]. The presence of the FeOOH group allows for the formation of Fe-O-Si covalent bonds [Keller, H., Rengel, H., Poganiuch, P., "Oxidation protection of magnetic iron particles by ultrathin layers of silanes," *Journal of Magnetism and Magnetic Materials* 155 (1996) 101-103.]. The particulate was allowed to settle, and the water was removed. To the wet, passivated particles, an 80% solution of a methoxy silane (isobutyl trimeth[yl]oxysilane) in 95% ethanol (balance water) was added under high speed stirring. The slurry was held constant at 40° C. for 6 hours. The solution was then decanted and the particle sludge was washed with pure solvent to ensure that the bonding of silane to the surface results in covalent polysorption between the silane and substrate, and not hydrogen bonding [Keller, 1996]. The washed particles were allowed to settle, and the solvent is again decanted. The particles were dried under vacuum at 110° C. for 12 hours. The dried particles were chipped out of the beaker, and ground into a fine powder.

Optionally, the silane coated iron particles are then treated with a solution of 5% solution of silicone functional surfactant [((N-pyrrolidonecarboxlic acid)propyl)-methysiloxane-dimethylsiloxane copolymer] in heptane.

Composite samples of uncoated and silane coated particles were tested in synthetic sea salt solution (Table 5) to test the corrosion behavior. The magnetizable particles were Hoeganaes 50 micron carbonyl iron powder and the matrix is a silicone polymer. The samples for submersion testing were of low iron concentration (5-10 wt %) and very thin. The thickness of the elastomer and the low iron content allows the sample to be slightly transparent to light, which is important for the use of optical microscopy. Testing of untreated and treated particles by immersion in synthetic seawater showed a dramatic reduction in the oxidation of the ferrous particulate embedded in the elastomer, even when the silane coating did not appear to be complete on all particles.

TABLE 5

| Expressed in ppm | Synthetic Sea Salt solution (SG 1.026) | Natural Sea Water ISBN 0-86720-057-X |
|---|---|---|
| pH | 8.80 | 8.3-8.45 |
| Chloride | 19154 | 19000 |
| Sodium | 10637 | 10500 |
| Sulfate | 2684 | 2700 |
| Magnesium | 1273 | 1350 |
| Calcium | 372 | 400 |
| Potassium | 428 | 380 |
| Bromide | 5.4 | 65 |
| Strontium | 6.87 | 8.0 |
| Silicate | 1.80 | 3.0 |
| Phosphate | <.003 | 0.07 |
| Manganese | 0.00 | .002 |

(Aqua Craft)

One of ordinary skill in the art will appreciate that methods, device elements, synthesis methods, and materials other than those specifically exemplified can be employed.

When a Markush group or other grouping is used herein, all individual members of the group and all combinations and subcombinations possible of the group are intended to be individually included in the disclosure. Specific names of compounds are intended to be exemplary, as it is known that one of ordinary skill in the art can name compounds differently.

All references cited herein are hereby incorporated by reference to the extent not inconsistent with the disclosure herein.

The invention claimed is:

1. A magnetorheological material comprising magnetizable iron or metallic iron alloy particles in an elastomeric matrix wherein the matrix is a thermoset selected from the group consisting of silphenylene-siloxanes, silarylene-siloxanes, poly(carborane-siloxane-acetylene)s and blends thereof, wherein the magnetizable particles are substantially aligned.

2. A magnetorheological material comprising magnetizable iron or metallic iron alloy particles in an elastomeric matrix, wherein the matrix is a thermoplastic selected from the group consisting of copolyesters, polyether block amides, blends thereof, and blends of thermoplastic polyurethane with polyvinyl chloride (PVC), polyvinylindene fluoride (PVDF), polycarbonate, or acrylonitrile butadiene styrene (ABS) wherein the magnetizable particles are substantially aligned.

3. A magnetorheological material comprising magnetizable particles in an elastomeric matrix, wherein the magnetizable particles are first coated with a silane coating other than an aminosilane coating, then coated with a surfactant coating, the magnetizable particles are substantially aligned and consist essentially of particles of iron or a metallic iron containing alloy, the silane coating is covalently bonded to the surface of the particles and the covalent bonds between the coating and the particle surface comprise Fe—O—Si bonds.

4. The material of claim 3 wherein the silane coating is an alkyl trimethoxysilane coating.

5. The material of claim 3, wherein the elastomeric matrix is a thermoset.

6. The material of claim 3 wherein the elastomeric matrix is a thermoplastic.

7. A method for making a thermoplastic magnetorheological elastomer, the method comprising the steps of:
   a. mixing magnetizable particles with a molten thermoplastic elastomer; and
   b. solidifying the elastomer while applying a magnetic field to the mixture, thereby aligning the particles
wherein the thermoplastic elastomer is selected from the group consisting of:
copolyesters, polyether block amides, blends thereof, and blends of thermoplastic polyurethane with polyvinyl chloride (PVC), polyvinylindene fluoride (PVDF), polycarbonate, or acrylonitrile butadiene styrene (ABS).

8. A method for making a thermoset magnetorheological elastomer, the thermoset elastomer being formed by curing a mixture of at least two components, the method comprising the steps of:

a. mixing the magnetizable particles with at least a first component
   b. mixing at least a second component with the mixture of step a)
   c. curing the mixture of step b) while applying a magnetic field, thereby aligning the particles
wherein the thermoset elastomer is selected from the group consisting of silphenylene-siloxanes, silarylene-siloxanes, poly(carborane-siloxane-acetylene)s and blends thereof.

9. A magnetorheological material comprising magnetizable particles in a polyurethane matrix, wherein the matrix is a polybutadiene polyol based polyurethane.

10. The material of claim 9, wherein the magnetizable particles are iron particles having a size between 3 and 600 microns and the concentration of iron particles is between 50 and 70 weight percent.

11. The material of claim 10, wherein the iron particles are between about 3 and about 7 microns in size.

12. A magnetorheological material comprising magnetizable particles in a thermoset matrix, the matrix being a blend of about 10 weight percent silicone to about 90 weight percent polyurethane.

13. The material of claim 12, wherein the magnetizable particles are iron particles having a size between 3 and 600 microns and the concentration of iron particles is between 60 and 80 weight percent.

14. A magnetorheological material comprising magnetizable particles in an elastomeric matrix, wherein the magnetizable particles are substantially aligned and comprise iron particles having a silane coating, the silane coating being bonded to the iron particles through Fe—O—Si bonds.

15. The material of claim 14 wherein the silane coating is a alkyl trimethoxysilane coating.

16. A magnetorheological material comprising magnetizable particles in an elastomeric matrix, wherein the magnetizable particles are first coated with a silane coating, then coated with a surfactant coating, wherein the surfactant coating is a silicone functional surfactant coating.

* * * * *